United States Patent [19]

Patel et al.

[11] Patent Number: 5,189,012
[45] Date of Patent: Feb. 23, 1993

[54] OIL BASED SYNTHETIC HYDROCARBON DRILLING FLUID

[75] Inventors: Arvind D. Patel; Raymond E. McGlothlin; Roger D. Bleier; H. N. Brinkley, all of Houston, Tex.

[73] Assignee: M-I Drilling Fluids Company, Houston, Tex.

[21] Appl. No.: 535,110

[22] Filed: Jun. 8, 1990

Related U.S. Application Data

[63] Continuation-in-part of Ser. No. 503,304, Mar. 30, 1990, abandoned.

[51] Int. Cl.⁵ .............................................. C09K 7/06
[52] U.S. Cl. .................................... 507/103; 507/116; 507/118; 507/127; 507/128; 507/130; 507/131; 507/135; 507/129; 507/138; 507/139; 507/905; 507/137
[58] Field of Search ................. 252/8.51, 8.511, 8.515; 507/118, 103, 905

[56] References Cited

U.S. PATENT DOCUMENTS

| | | | |
|---|---|---|---|
| 2,222,949 | 11/1940 | Henkes . | |
| 2,316,967 | 4/1943 | Miller | 252/8.51 |
| 2,316,968 | 4/1943 | Miller | 252/8.51 |
| 2,500,163 | 3/1950 | Garwood | 585/18 |
| 2,698,833 | 1/1955 | Wilson | 252/8.51 |
| 3,108,068 | 10/1963 | Weiss et al. | 252/8.51 |
| 3,217,802 | 11/1965 | Reddie et al. | 166/301 |
| 3,396,105 | 8/1968 | Burdyn et al. | 252/8.51 |
| 4,208,285 | 6/1980 | Sample | 175/206 |
| 4,212,794 | 7/1980 | Grodde et al. | 252/8.51 X |
| 4,263,465 | 4/1981 | Sheng et al. | 585/18 |
| 4,282,392 | 8/1981 | Cupples et al. | 585/10 |
| 4,374,737 | 2/1983 | Larson et al. | 252/8.51 |
| 4,387,514 | 6/1983 | McCaskill | 175/206 |
| 4,436,636 | 3/1984 | Carnicom | 252/8.51 |
| 4,464,269 | 8/1984 | Walker et al. | 252/8.554 |
| 4,502,963 | 3/1985 | Harmon | 252/8.51 |
| 4,508,628 | 4/1985 | Walker et al. | 252/8.515 |
| 4,525,285 | 6/1985 | Son et al. | 252/8.51 |
| 4,544,756 | 10/1985 | Patel | 548/354 |
| 4,575,428 | 3/1986 | Clapper et al. | 252/8.515 |
| 4,587,368 | 5/1986 | Pratt | 585/12 |
| 4,631,136 | 12/1986 | Jones | 252/8.51 |
| 4,787,900 | 11/1988 | Boyd | 252/8.511 |
| 4,830,765 | 5/1989 | Perricone et al. | 252/8.51 |
| 4,839,096 | 6/1989 | Dennis et al. | 252/8.515 |
| 4,876,017 | 10/1989 | Trahan et al. | 252/8.51 |
| 5,096,883 | 3/1992 | Mercer et al. | 507/103 |

FOREIGN PATENT DOCUMENTS

89300524.9 7/1989 European Pat. Off. .

*Primary Examiner*—Gary L. Geist
*Attorney, Agent, or Firm*—Arnold, White & Durkee

[57] ABSTRACT

The present invention relates to an improved continuous phase for an oil based drilling fluid and specifically a synthetic hydrocarbon continuous phase which is non-polluting and minimally toxic. The invention provides excellent drilling fluid properties under a wide variety of drilling conditions. The synthetic hydrocarbons are selected from the group consisting of branched chain oligomers synthesized from one or more olefins containing a $C_2$ to $C_{14}$ chain length and wherein the oligomers have an average molecular weight of from 120 to 1000. In the drilling fluid compositions, suitable emulsifiers, wetting agents, viscosifiers, weight materials and fluid loss additives are utilized in conjunction with water and/or a brine phase for the desired rheological properties.

23 Claims, 2 Drawing Sheets

OIL BASED SYNTHETIC HYDROCARBON DRILLING FLUID

CROSS-REFERENCE TO RELATED APPLICATION

This application is a continuation-in-part of commonly assigned copending patent application U.S. Ser. No. 503,304 filed Mar. 30, 1990, now abandoned.

BACKGROUND OF THE INVENTION

The invention relates to improved drilling fluids used in the drilling of subterranean oil and gas wells as well as other drilling fluid applications and drilling procedures. The invention is particularly concerned with non-polluting, minimally toxic drilling fluids which are based on synthetic hydrocarbons, having molecular weights of from 120 to 1000, derived from olefinic monomers and displaying functional characteristics, e.g., viscosity characteristics, acceptable in drilling fluid applications. The olefinic monomers are from the groups consisting of a carbon chain from $C_2$ to $C_{14}$ having at least one polymerizible double bond. The oligomeric or polymeric synthetic hydrocarbons thus obtained from olefins exhibit minimal toxicity toward aquatic life and possess valuable rheological properties when used in drilling fluids.

In rotary drilling there are a variety of functions and characteristics that are expected of a drilling fluid ("drilling mud" or simply "mud"). The drilling fluid is expected to carry cuttings from beneath the bit, transport them up the annulus, and permit their separation at the surface while at the same time the rotary bit is cooled and cleaned. A drilling mud is also intended to reduce friction between the drill string and the sides of the hole while maintaining the stability of uncased sections of the borehole. Likewise the drilling fluid is formulated to prevent unwanted influxes of formation fluids from permeable rocks penetrated and likewise to form a thin, low permeability filter cake which seals pores and other openings and formations penetrated by the bit. Finally, the drilling fluid is used to collect and interpret information available from drill cuttings, cores and electrical logs.

Drilling fluids are typically classified according to their base material. In water based muds, solid particles are suspended in water or brine. Oil can be emulsified in the water. Nonetheless, the water is the continuous phase. Oil based muds are exactly the opposite. Solid particles are suspended in oil and water or brine is emulsified in the oil and therefore the oil is the continuous phase. The final class of drilling fluids are pneumatic fluids in which drill cuttings are removed by a high velocity stream of air or natural gas.

On both offshore and inland drilling barges and rigs, drill cuttings are conveyed up the hole by a drilling fluid. Water based drilling fluids may be suitable for drilling in certain types of formations; however, for proper drilling in other formations, it is desirable to use an oil base drilling fluid. With an oil base drilling fluid, the cuttings, besides ordinarily containing moisture, are necessarily coated with an adherent film or layer of oily drilling fluid which may penetrate into the interior of each cutting. This is true despite the use of various vibrating screens, mechanical separation devices and various chemical and washing techniques. Because of pollution to the environment, whether on water or on land, the cuttings cannot be properly discarded until the pollutants have been removed.

One method to accomplish the pollutant removal has been placing the screened cuttings in a standpipe or other vessel filled with sea water and periodically skimming off the layer of displaced oil as it rises to the surface in the vessel. Another method attempted is burning, i.e., oxidatively incinerating, the oil from the cuttings. Still another method is physically transporting the oily cuttings to a remote site for subsequent disposal. In each instance the method of disposal of the cuttings has proved ineffective and inefficient.

The problems associated with the environmental compatibility of drill cuttings, and the chemicals contained therein, has long been recognized as a problem in the oil and gas exploration industry. Typically the approaches for solving the environmental compatibility problems have involved the physical treatment of the drill cuttings, see for example U.S. Pat. No. 4,208,285 wherein an apparatus is provided for removing volatile materials from drill cuttings by vaporizing the materials on the cuttings in a non-oxidative atmosphere and U.S. Pat. No. 4,387,514 which provides a method and apparatus for drying oil well drill cuttings to eliminate pollution causing organic materials from the cuttings.

It is apparent to anyone selecting or using a drilling fluid for oil and gas exploration that an essential component of a selected fluid is that it be properly balanced to achieve the necessary characteristics for the specific end application. As stated hereinabove, the typical compositions include oil based muds, water based muds and pneumatic fluids. For purposes of this application, only oil and water based mud systems will be relevant. The vast majority of oil and gas exploration is done with water based muds. The primary reason for this preference is price and environmental compatibility. Oil based muds, while being substantially more expensive than water based drilling fluids, are likewise environmentally incompatible. As a result, the use of oil based muds has been historically limited to those situations where they are necessary.

This long felt need in the oil and gas exploration industry for an environmentally acceptable drilling fluid which either is an oil based drilling fluid or performs as an oil based drilling fluid has now been achieved by applicants' invention. By use of applicants' invention and the use of synthetic hydrocarbons the functional characteristics of an oil based drilling system are achieved while the environmental compatibility of conventional water based systems is attained. Such a result has until recently been thought theoretically and practically impossible.

Various advantages of using oil based drilling mud in the rotary drilling of boreholes in the earth have been known for some time. In summary, it can be said that under certain conditions, one or more of the following advantages make oil based muds more desirable than water based muds. Lubricity characteristics are excellent. Drilling fluid weighing less than about 8 pounds per gallon can be prepared with an oil based mud, and have proved advantageous in certain special drilling and coring situations. The penetration of the formation by water is avoided. Cores can be recovered in an in situ condition, and in the presence of hydrous clays and bentonites, no swelling or sloughing is experienced to reduce porosities or cause pipe sticking difficulties. There are fewer problems with hydrophilic shale formations drilled. Evaporite sections such as salt zones can be drilled with minimal leaching of the salt. Furthermore, oil based muds can be formulated to withstand temperatures up to 500 degrees Fahrenheit.

The principal difficulties encountered in the use of oil based drilling fluids are probably those of handling, fire hazard, environmental unacceptability and the intrinsic cost per barrel, since oil is much more expensive than water. Some materials which heretofore have been added to oils in order to produce satisfactory drilling muds have been of an intense black color, e.g., carbon black and asphalt of various kinds, and oilfield workers have a strong resistance to handling such materials. Not just any material can be added to an oil for the purpose of making a drilling mud, because the material to be added must not only increase the viscosity, though not to too great an extent, and decrease the fluid loss, but must also be dispersable in the oil, and above all must not be of such a nature as to clog the formations drilled through.

In addition, oil based muds offer potential advantages; better lubricating qualities, higher boiling points, and lower freeze points. Because of the cost of preparing an oil mud is always more than that of the same density water muds, the economic justification for selecting an oil mud must come from its superior performance under the particular conditions of use.

There is, however, strong sentiment that although the initial differential cost of oil based muds versus aqueous based muds favors aqueous based, as the well is drilled deeper and as drilling operations last longer, the oil based muds actually become more economical due to the fact that the constituents do not have to be replenished as often and the fact that the oil based muds are reusable for substantially longer periods of time.

As can be seen from the above, the development of a drilling fluid that exhibits desirable characteristics of both a water based and oil based drilling fluid has long been an unachieved goal of the oil and gas exploration industry. With the practice of applicants' invention this goal has been realized.

PRIOR ART

In the drilling of wells to recover hydrocarbons and gas from subterranean deposits, it is common practice to use a rotary drilling procedure. The drill bit cuts into the earth, causing the cuttings to accumulate as drilling continues. The drilling fluid is used to carry these cuttings to the surface where they are separated and removed. The drilling fluid is recirculated through the drill pipe at the drill bit to carry out new cuttings. Thus, the bottom of the hole is kept clean and free of cuttings at all times.

Although aqueous-based drilling fluids which utilize water, brine or sea water as the primary liquid phase are dominant throughout much of the drilling industry, various oil based drilling fluids have been developed and are used in the field. These oil based drilling fluids utilize hydrocarbons such as diesel and mineral oils as the continuous phase. Normally, five to seventy percent of the aqueous phase is emulsified in the hydrocarbon phase utilizing suitable emulsifiers and wetting agents in these fluids. Oil based drilling fluids are also commonly known as oil muds. The use of oil muds is quite common in high temperature wells and wells with troubled shale zones.

The oil muds exhibit desirable rheological properties over a wide range of temperatures in which they are utilized. Also, oil muds typically have excellent lubricity properties in comparison to water based muds, which reduces sticking of the drillpipe due to a reduction in frictional drag. Since few if any oil wells are truly vertical there is always frictional contact between the drill string and borehole. Frictional contact requiring excess torque output from motors is undesirable. The lubricating characteristics ("lubricity") of the drilling mud provides the only known means for reducing the friction. Oil muds in general have better lubricity than water based muds. Additionally, the oil based muds are beneficial to shale stabilization, corrosion inhibition, and fluid loss control.

Although oil based muds have performance characteristics distinct from water based muds, some of which are considered advantageous, there are various disadvantages such as cost, fire hazard, difficulty of mixing the mud, and environmental incompatibility effects. Among the disadvantages characteristic of oil muds, the single overriding detrimental effect is the environmental pollution effect associated with both onshore and offshore drilling operations. The cleanup of accidental discharge of oil muds in offshore environments is expensive and necessary due to toxicity of oil muds to aquatic life. Currently, in the U.S., cuttings drilled using oil based muds are required to be disposed of in an environmentally acceptable fashion, most of which are more expensive and more inconvenient than disposal methods for water based drilling fluids.

Such oil based drilling fluids are described, for instance, in U.S. Pat. Nos. 2,222,949, 2,316,967, 2,316,968 and 2,698,833. These patents describe the use of nonaqueous drilling fluids using diesel oil as the carrier or continuous phase. Several other publications describe the use of mineral oils for low toxicity oil muds. However, mineral oils that were once considered to be toxicologically and environmentally superior to diesel oil, are now also considered to be relatively toxic under increasingly stringent environmental regulations. Several attempts to develop modified non-polluting fluids have been made (U.S. Pat. Nos. 4,631,136; 4,830,765). These are not true hydrocarbon fluids and require an aqueous continuous phase which does not provide desirable functional characteristics, for instance, shale stability derived with oil based muds.

Strict regulations are imposed by governmental regulatory agencies especially in light of what are generally viewed as environmental disasters involving oil spills. These regulations have not only made the use of oil based drilling fluid more costly but in some places difficult or impossible to use in compliance with regulatory guidelines. Environmental concerns have prompted the development of a new environmentally acceptable drilling fluid. This drilling fluid is designed to be essentially non-polluting, non-toxic and safe to aquatic life. Pollution is usually defined as a sheen, film or discoloration of surface water formed by drilling fluids. The U.S. Environmental Protection Agency ("EPA") has specified a Mysid shrimp bioassay as the means for assessing marine aquatic toxicity of drilling fluids. A detailed account of the procedure for measuring toxicity of drilling fluids is described in Duke, T. W., Parrish, P. R.; "Acute Toxicity of Eight Laboratory Prepared Generic Drilling Fluids to Mysids (Mysidopsis Bahia)" 1984 EPA-600/3-84-067. Such report is hereby incorporated by reference.

For purposes of understanding the term "minimal toxicity" within the context of this application it refers to an $LC_{50}$ of greater than 30,000. Although 30,000 has been the number used for purposes of evaluation it should not be considered a limitation on the scope of this invention. Other $LC_{50}$ values may be viable in various environmental settings. An $LC_{50}$ value of greater than 30,000 has been equated to an "environmentally compatible" product.

It has been known for some time that synthetic water-dispersable polymers could be used as drilling fluid components. In general, acrylic polymers and alkylene oxide polymers have been described as being useful in drilling muds. See Darley and Gray, "Composition and Properties of Drilling and Completion Fluids," Gulf Publishing Co., Fifth Edition, pgs. 576–580. However, no prior art disclosure mentions or appreciates the essential molecular weight and chain length requirements of applicants' invention. The prior art materials do not possess the essential toxicity and environmental compatibility of applicants' invention.

U.S. Pat. No. 4,876,017 issued Oct. 24, 1989 discloses a synthetic hydrocarbon compound, in particular polyalphaolefin, to be used in a water based drilling fluid as a downhole lubricant. According to the disclosure, the resulting material is non-toxic to marine life and does not produce a sheen on a water surface when dumped into a body of water. The compound also serves as a spotting fluid for the removal of lodged tools downhole. U.S. Pat. No. 4,876,017 does not disclose or appreciate that an oil based invert emulsion capable of suspending weight materials and stable under downhole temperature and pressure conditions can be made from synthetic hydrocarbons as described in applicants' invention.

SUMMARY OF THE INVENTION

The present invention relates to an essentially non-polluting, substantially non-toxic drilling fluid with continuous phase composed of synthetic hydrocarbons. The synthetic hydrocarbons that are believed to be useful in the practice of this invention are branched chain oligomers synthesized from one or more olefins (unsaturated hydrocarbons) containing a $C_2$ to $C_{14}$ chain length and wherein the oligomers have an average molecular weight of from 120 to 1000. In the preferred embodiments of this invention the synthetic hydrocarbons are branched chain oligomers synthesized from one or more olefins containing a $C_2$ to $C_{12}$ chain length and wherein the oligomers have an average molecular weight of from 160 to 800. In the most preferred embodiments of this invention the synthetic hydrocarbons are branched chain oligomers synthesized from one or more oligomers containing a $C_2$ to $C_{10}$ chain length and wherein the oligomers have an average molecular weight of 200 to 600. In each instance the synthetic hydrocarbon mixture must have performance and viscosity characteristics that permit functional utility as a drilling fluid or as a component of an oil based drilling fluid. In its broadest form the synthetic hydrocarbon mixture should have a viscosity of from 1.0 to 6.0 centistokes, preferable a viscosity of from 1.5 to 4.0 centistokes and most preferably from 1.5 to 3.5 centistokes. The synthetic hydrocarbons of the present invention may be hydrogenated (saturated), partially hydrogenated or non-hydrogenated.

Oils such as diesel or mineral oils produced directly or indirectly from petroleum crude oil have traditionally been used as the base oils for oil based drilling fluids. These oils contain a large variety of hydrocarbon compounds including aromatics and straight chain paraffins. The absence of these and the uniformity of the carbon numbers distinguish the synthetic hydrocarbon oils of this invention from petroleum derived oils.

The synthetic hydrocarbon oils of this invention are manufactured by oligomerizing alpha-olefins or other olefins. The resulting oils are mixtures of branched hydrocarbon molecules with carbon numbers that are even multiples of the base olefin. For instance, a synthetic hydrocarbon oil made from $C_8$ olefins contains only molecules that are $C_8$, $C_{16}$, $C_{24}$, $C_{32}$, etc. These oils can be hydrogenated to achieve complete saturation, or partially hydrogenated, or left unhydrogenated. Preferably they contain no aromatics. Since these oils are synthetic materials, their molecular size and structure, and hence their performance characteristics, can be controlled in a predictable and understandable manner. It is also possible to use mixtures of these oils and also oil synthesized from combinations of olefins.

Prior to the present invention, it was not obvious that (1) the synthetic hydrocarbon oils would make stable invert emulsions and that these invert emulsions could be treated to suspend solids; (2) the suspensions would remain stable under the temperature and pressure conditions encountered during drilling subterranean oil and gas wells; and (3) the resulting muds would have favorable toxicity characteristics.

The subject synthetic hydrocarbons are pure and minimally toxic to aquatic plant and animal life. The primary embodiment of this invention includes drilling fluids in which the synthetic hydrocarbon oil comprises the continuous phase of an oil based drilling fluid.

The drilling fluid compositions of this invention are improved compositions for use offshore and onshore due to their minimal toxicity. These compositions are stable drilling fluids which are effective replacements for conventional oil muds. Mysid shrimp are used in bioassay tests of laboratory prepared drilling fluids containing the synthetic hydrocarbons and have shown excellent survivability.

The improved drilling fluid of this invention exhibits the functional characteristics of an oil based drilling fluid and the environmental compatibility of most water based drilling fluids. Specifically, the improved drilling fluid of this invention is characterized by improved toxicity and pollution characteristics in comparison to conventional oil based drilling fluids and specifically improved lubricity and wellbore stability in comparison to water based drilling fluids.

In alternate embodiments of this invention, the improved drilling fluid can include wetting agents, viscosifiers and other materials common to the development and formulation of drilling fluids. As mentioned hereinabove, it is essential that the drilling fluid that is selected and formulated for use in any particular well application be balanced to the conditions of the well. Therefore, although the base ingredient remains the same, i.e., synthetic hydrocarbon, other components can be added.

BRIEF DESCRIPTION OF THE DRAWINGS

The drawings are supplied to illustrate the functional characteristics of the synthetic hydrocarbon drilling fluids of this invention. Specifically, the data represented in FIGS. 1–4 was derived from testing conducted on Huxley-Bertram HTHP Rotational Viscometer.

DESCRIPTION OF THE PREFERRED EMBODIMENT

The present invention relates to minimally toxic oil based drilling fluids which are functionally capable of carrying out additional wellbore functions such as a spotting fluid, packer-fluid, completion fluid, workover fluid and coring fluid. The drilling fluid compositions of the present invention can be modified according to the end use of the fluid using suitable emulsifiers, viscosifiers, density materials and suspending agents.

The following table indicates the preferred olefinic compounds from which the branched chain oligomeric and polymeric synthetic hydrocarbon oils can be manufactured.

| Carbon Atoms | Compound |
|---|---|
| $C_2$ | Ethylene |
| $C_3$ | Propene |
| $C_4$ | Butene-1, Isobutene |
| $C_5$ | Pentene |
| $C_6$ | Hexene |
| $C_7$ | Heptene |
| $C_8$ | Octene |
| $C_9$ | Nonene |
| $C_{10}$ | Decene |
| $C_{12}$ | Dodecene |
| $C_{13}$ | Tridecene |
| $C_{14}$ | Tetradecene |

Various synthetic hydrocarbons are commercially available to be used in the present invention. For example, polypropenes from AMOCO Chemical Company, product numbers #9009 and 9011; and Chevron Chemical Company's product identified as Polymer-560; polybutenes Indopol L-14 and H-15 offered by AMOCO Chemical Company, as well as mixtures comprising dimeric, trimeric and tetrameric oligomers of 1-decene from Emery, Mobil, Ethyl and Chevron Corporations are suitable for the present invention. These synthetic hydrocarbon oils can also be blended to achieve the desired chemical characteristics, which are determined according to the end use of the product.

As identified hereinbefore the synthetic hydrocarbons that are believed to be useful in the practice of this invention are characterized by chain length and molecular weight parameters. Useful synthetic hydrocarbon oils consist of branched chain oligomers synthesized from one or more olefins containing a $C_2$ to $C_{14}$ chain length and wherein the oligomers have an average molecular weight of from 120 to 1000. In the preferred embodiments of this invention the synthetic hydrocarbons are branched chain oligomers synthesized from one or more olefins containing a $C_2$ to $C_{12}$ chain length and wherein the oligomers have an average molecular weight of from 160 to 800. In the most preferred embodiments of this invention the synthetic hydrocarbons are branched chain oligomers synthesized from one or more oligomers containing a $C_2$ to $C_{10}$ chain length and wherein the oligomers have an average molecular weight of 200 to 600.

In each instance the synthetic hydrocarbon mixture must have performance and viscosity characteristics that permit functional utility as a drilling fluid. In its broadest form the synthetic hydrocarbon or hydrocarbon mixture should have a viscosity of from 1.0 to 6.0 centistokes, preferable a viscosity of from 1.5 to 4.0 centistokes and most preferably from 1.5 to 3.5 centistokes. The synthetic hydrocarbons of the present invention may be hydrogenated (saturated), partially hydrogenated or non-hydrogenated. For safety at the wellsite the flashpoint of the oil should exceed 150° F. and preferably exceed 200° F.

The interfacial tension between oil and water is very high, so if the liquids are mixed together they mechanically separate immediately when the agitation ceases, to minimize the interfacial area. Lowering the interfacial tension with a surfactant enables one liquid to form a stable dispersion of fine droplets in the other. The lower the interfacial tension, the smaller the droplets and the more stable the emulsion. In most emulsions, oil is the dispersed phase and water is the continuous phase. However, in "invert emulsions" in which water is the dispersed phase, a suitable emulsion can be formed upon the use of a suitable emulsifier.

Whether an oil-in-water or water-in-oil emulsion is formed depends on the relative solubility of the emulsifier in the two phases. Thus, a preferentially water soluble surfactant, such as sodium oleate, will form an oil-in-water emulsion because it lowers the surface tension on the water side of the oil-water interface, and the interface curves toward the side with the greater surface tension, thereby forming an oil droplet enclosed by water. On the other hand, calcium and magnesium oleates are soluble in oil, but not in water, and thus form water-in-oil emulsions.

An invert water-in-oil emulsion has oil as the continuous phase. Likewise, the synthetic hydrocarbon of this invention may comprise up to 100% by volume of the total composition. Water, usually in the form of brine, is normally added in these compositions. Water may be added to the drilling fluid up to a volume of 70%. In more preferred embodiments water is added from 5% to 65% by volume and in the most preferred embodiment water is added from 10% to 60% by volume. These brines contain salts such as NaCl and/or $CaCl_2$ in varying amounts ranging up to 40% by weight.

The compositions of one embodiment of this invention require emulsifiers to incorporate the brine or water phase into the synthetic hydrocarbon continuous phase. Various emulsifiers are available for this application. The emulsifiers are chemical compounds which have both oleophilic and hydrophilic parts. The emulsifiers that have demonstrated utility in the emulsions of this invention are fatty acids, soaps of fatty acids, and fatty acid derivatives including amido-amines, polyamides, polyamines, esters (such as sorbitan monoleate polyethoxylate, sorbitan dioleate polyethoxylate) imidazolines alcohols and combination derivatives of the above. Blends of these materials as well as other emulsifiers can be used for this application. Versacoat ® and Versacoat ® N.S. are emulsifiers manufactured and distributed by M-I Drilling Fluids Company.

The oil based drilling fluid compositions of this invention may contain an additional chemical known as a wetting agent. Various wetting agents are available and can be included in the compositions. The wetting agents included, but not limited to the present invention, are fatty acids, crude tall oil, oxidized crude tall oil, organic phosphate esters, modified imidazolines and amidoamines, alkyl aromatic sulfates and sulfonates and the like and combinations or derivatives of the above. Versawet ® and Versawet ® NS are wetting agents manufactured and distributed by M-I Drilling Fluids Company.

Organophilic clays, normally amine treated clays, are also used as viscosifiers in the oil based drilling fluid composition of the present invention. Other Viscosifiers, such as oil soluble polymers, polyamide resins, polycarboxylic acids and soaps can also be used. The amount of viscosifier used in the composition can vary depending upon the end use of the composition. However, normally about 0.1% to 10% by weight range are sufficient for most applications. VG-69 is an organoclay material distributed by M-I Drilling Fluids Company.

The drilling fluid composition of this invention may optionally contain a weight material. The quantity depends upon the desired density of the final composition. The preferred weight materials include, but are not limited to, barite, iron oxide, calcium carbonate and the like. The weight material is typically added to result in a drilling fluid density of up to 24 pounds per gallon, preferably up to 21 pounds per gallon and most preferably up to 19.5 pounds per gallon.

Finally, fluid loss control agents such as modified lignites, polymers, asphaltic compounds and the like can be added to the drilling fluid system of this invention.

The following examples are submitted for the purpose of illustrating the toxicity and performance characteristics of the synthetic hydrocarbons of this invention. These tests were conducted in accordance with the procedures in API Bulletin RP 13B-2, 1990. The following abbreviations are sometimes used in describing the results of experimentation:

"PV" is plastic viscosity which is one variable used in the calculation of viscosity characteristics of a drilling fluid.

"YP" is yield point which is another variable used in the calculation of viscosity characteristics of drilling fluids.

"GELS" is a measure of the suspending characteristics and the thixotropic properties of a drilling fluid.

"ES" is the term used to indicate the stability of an emulsion.

EXAMPLE 1

To determine the toxicity of the synthetic hydrocarbons which have been identified as exhibiting the desired performance characteristics in the present invention, tests were conducted on water soluble fractions of the synthetic hydrocarbons and the results compared to state of the art oils. The conclusions regarding toxicity were based on a determination and comparison of the concentration of the synthetic hydrocarbon in the aqueous phase which is lethal to 50% of live test organisms after 96 hours of continuous exposure. The aquatic animals used in the tests were mysid shrimp (Mysidopsis Bahia). The detailed procedure on the testing method is found in "Duke, T. W., Parrish, P. R., etc. "Acute Toxicity of Eight Laboratory Prepared Generic Drilling Fluids to Mysids (Mysidopsis Bahia)", 1984 EPA-600/3-84-067.

Bioassays were conducted using the suspended particulate phase ("SPP") of the drilling mud following the U.S. Environmental Protection Agency protocol in Appendix 3 of "Effluent Limitation Guidelines and New Source Performance Standards: Drilling Fluids Toxicity Test", *Federal Register* Vol. 50, No. 165, 34631–34636. The SPP is the unfiltered supernatant extracted from a 1:9 mixture of the test fluid and seawater which is allowed to settle for one hour. Synthetic seawater was used in preparing the SPP and the test negative controls. The 1:9 test sample/seawater slurry was prepared by stirring without aeration, 300 ml of the mud with 2700 ml of seawater in a clean, one gallon glass container for five minutes. The pH of the slurry was measured and adjusted to within 0.2 pH units of the seawater using 6N HCl. The slurry was then allowed to settle for one hour and the supernatant (SPP) was decanted. Aeration was not supplied to the 100% SPP since the dissolved oxygen level was more than 65% of saturation. The pH of the SPP was measured and further adjusted with 10% HCl. The definitive bioassay was conducted using the SPP. The definitive bioassay was initiated on test samples using test solutions of 20%, 10%, 5%, 1% and 0.5% SPP.

For the definitive test, 20 mysids were added to each of the concentrations of test solution (SPP) and to a seawater control. Water quality was measured and observations of the test animals were made at 24 hour intervals. After 96 hours, the test was terminated. A standard control test was also conducted utilizing the same test methods as used for the drilling mud. However, sodium dodecyl sulfate (95% pure) was used for the five test substance concentrations. The results of the bioassays are given in the following table as the $LC_{50}$ value for 96 hours.

| Trade Name | Generic Description | M.W. | $LC_{50}$ |
|---|---|---|---|
| Amoco - 9009 | polypropene | 400 | $>1 \times 10^6$ ppm |
| Indopol L-14 | polybutene | 320 | $>1 \times 10^6$ ppm |
| X-10 | polypropene | 310 | 914,650 ppm |
| Emery 3002 | oligomeric decene | 290 | 574,330 ppm |
| P-560 | polypropene | 198 | 30,000 ppm |
| PT-12 | polypropene | 170 | 10,800 ppm |
| Diesel Oil #2 | diesel oil | — | 1,599 ppm |
| LVT-Conoco | mineral oil | — | <13,245 ppm |
| Isopar M (Exxon) | petroleum product | — | <30,000 ppm |

The above table indicates that the synthetic hydrocarbons of this invention are non-toxic when compared with the present state of the art oils used in making oil based muds. All of these oils were tested in generic mud #7 at 2% concentration.

EXAMPLE 2

Similar toxicity tests were conducted on the following drilling fluid compositions and compared with other oil based muds.

The oil mud was mixed with the water in a five gallon bucket at a ratio of 1 part mud to 9 parts seawater and stirred for 20 hours using a lightening mixer. The mixture was allowed to settle for at lease one (1) hour and no more than two (2) hours whereupon the water phase, i.e., water soluble fraction, was siphoned off down to within three (3) inches of the top of the settled mud solids. Said water was then utilized to make the appropriate test concentration.

| Composition 1 | |
|---|---|
| Emery 3002 (oligomers of 1-decene) | 204.00 grams |
| Water | 60.55 grams |
| CaCl$_2$ | 21.4 grams |
| VERSAWET (Oxidized Crude Tall Oil) | 4.0 grams |
| Amido Amine Emulsifier | 2.0 grams |
| Amine treated clay | 4.0 grams |
| Viscosity Agent (Amide Resin) | 1.0 grams |
| Barite weight material | 111.7 grams |
| Composition 2 | |
| Emery 3002 | 171.00 grams |
| Water | 50.75 grams |
| CaCl$_2$ | 17.9 grams |
| VERSAWET (oxidized crude tall oil) | 4.0 grams |
| VERSACOAT (amido amine emulsifier) | 2.0 grams |
| Amine treated clay | 2.0 grams |
| Viscosity agent (amide resin) | 1.0 grams |
| Barite weight material | 329.0 grams |

Composition 1 and Composition 2 had 96 hour LC$_{50}$ values of 200,000 ppm or greater. The drilling fluid compositions of this invention contains these minimally toxic synthetic hydrocarbons as the base for either a water-in-oil emulsion or oil-in-water emulsion form.

EXAMPLE 3

The following are the examples of drilling fluid compositions utilizing a polybutene synthetic hydrocarbon obtained from AMOCO Chemical Company (Indopol L-14).

| | Composition by Mud Weight | | | |
|---|---|---|---|---|
| Chemicals | 10 ppg mud samples | 12 ppg mud samples | 14 ppg mud samples | 6 ppg mud samples |
| Polybutene (L-14) | 204 | 187 | 171 | 171 |
| Water | 60.55 | 55.6 | 50.75 | 22.75 |
| CaCl$_2$ | 21.4 | 19.6 | 17.9 | 8.0 |
| Emulsifier | 2.0 | 2.0 | 2.0 | 2.0 |
| Wetting Agent | 4.0 | 4.0 | 4.0 | 4.0 |
| Viscosifier-1 Organoclay | 4.0 | 2.0 | 2.0 | 2.0 |
| Viscosifier Amide | 1.0 | 0.5 | 0.5 | 0.5 |
| Weight Material Barite | 111.7 | 220.5 | 329 | 449.8 |

(weight of additive in all samples in grams)

These drilling fluid compositions had the following physical properties before and after heat aging at 250° F. for 16 hours. Rheological properties were measured at 150° F.

| | 10 ppg Mud | 12 ppg Mud | 14 ppg Mud | 16 ppg Mud |
|---|---|---|---|---|
| 600 RPM Reading | 89 | 104 | 151 | 171 |
| 300 RPM | 50 | 59 | 95 | 101 |
| PV | 39 | 45 | 56 | 70 |
| YP | 11 | 14 | 39 | 31 |
| GELS | 6/9 | 7/10 | 15/22 | 15/19 |
| After Heat Aging at 250° F. | | | | |
| PV | 34 | 36 | 53 | 63 |
| YP | 10 | 7 | 12 | 15 |
| GELS | 5/7 | 3/5 | 5/11 | 8/13 |
| ES | 860 | 780 | 840 | 1200 |

The above data establishes that a stable invert emulsion drilling fluid composition can be prepared utilizing synthetic hydrocarbon oils.

EXAMPLE 4

In another embodiment of the invention, synthetic hydrocarbon Emery 3002, a synthetic oil with a viscosity of approximately 2 cSt. at 212° F. obtained from Emery Chemical Company, was used in place of the polybutene (Indopol L-14) in Example 3 for the preparation of the 10 ppg, 12 ppg, 14 ppg and 16 ppg density drilling fluid compositions.

The following rheological data were obtained before and after heat aging at 250° F. The rheological data were taken at 120° F.

| | Rheologies at 120° F. | | | |
|---|---|---|---|---|
| | 10 ppg | 12 ppg | 14 ppg | 16 ppg |
| | Initial | | | |
| PV | 17 | 30 | 30 | 31 |
| YP | 2 | 10 | 8 | 8 |
| GELS | 3/3 | 7/9 | 6/8 | 5/7 |
| | Heat Aged 250° F./16 hours | | | |
| PV | 17 | 29 | 30 | 32 |
| YP | 6 | 10 | 9 | 5 |
| GELS | 4/5 | 6/10 | 7/8 | 5/9 |
| ES | 760 | 980 | 860 | 1400 |

The above data establishes that the formulations with Emery 3002 oil can be made with stable emulsions at various densities.

EXAMPLE 5

To establish the use of synthetic hydrocarbons in preparation of oil mud drilling compositions with a high water content, the following composition was made.

| Composition 3 | |
|---|---|
| Emery 3002 | 115.43 grams |
| CaCl$_2$ | 49.58 grams |
| Lime | 2.0 grams |
| VERSACOAT | 6.0 grams |
| VERSAWET | 6.0 grams |
| VG-69 | 4.0 grams |
| Viscosifier Amide | 1.0 grams |
| Water | 142.8 grams |
| Barite | 134 grams |

The following rheological properties were obtained after heat aging at 250° for 72 hours.

| PV | 68 |
|---|---|
| YP | 36 |
| GELS | 5/12 |
| ES | 180 |

EXAMPLE 6

In still another embodiment of the invention, a waterless drilling fluid composition using the synthetic hydrocarbon of this invention was made for application in coring fluids and packer fluids. The following composition was used in preparation of a waterless drilling fluid.

| Composition 4 | |
|---|---|
| Polybutene (L-14) | 236 grams |
| VERSAWET | 2 grams |
| Organoclay (VG-69) | 4 grams |
| Viscosifier (Polyamide) | 8 grams |

-continued

| Composition 4 | |
|---|---|
| Barite | 270 grams |

The following rheological data before and after heat aging at 200° F. for 16 hours were obtained. The rheology was determined at 120° F.

| | Reology at 120° F. | |
|---|---|---|
| | Initial | Heat Aged 250° F. for 16 Hours |
| PV | 47 | 59 |
| YP | 8 | 12 |
| GELS | 4/8 | 7/10 |

The following data shows the effect of pressure on viscosity of a 2 cSt synthetic hydrocarbon oil compared to a typical mineral oil. The data shows that as the pressure increases, the viscosity of the base oil increases. It can be observed that at ambient pressure, the viscosity of the synthetic material is slightly higher. However, at 8,000 psi the viscosity of the two materials is about equal. This confirms that there are no unexpected viscosity humps when using this synthetic material to prepare an oil mud.

EXAMPLE 7

| | Huxley Bertram Viscosity at 78° F. | | |
|---|---|---|---|
| Pressure (psi) | Mineral Oil | Synthetic Oil | 2nd Test |
| 0 | 5.2 | 7.1 | 6.0 |
| 2000 | 6.3 | 8.1 | 11.5 |
| 4000 | 8.4 | 9.9 | 11.7 |
| 6000 | 10.0 | 14.1 | 12.6 |
| 8000 | 12.8 | 13.1 | 13.3 |

The 2 cSt viscosity synthetic hydrocarbon was then used to make up a high water content oil mud. The mud formulation used was:

| Composition 5 | |
|---|---|
| Emery 3002 Oil | 123.0 |
| VERSACOAT N.S. | 4.0 |
| VERSAWET N.S. | 4.0 |
| Lime N.S. | 2.0 |
| VG-69 U.S. | 2.0 |
| Barite | 43.0 |
| CaCl$_2$ Brine 25% | 209.0 |

After stabilization by heat aging 16 hours at 250° F., the system was then compared to a high water content field mud having mineral oil as the base fluid. The mineral oil based field mud had been used satisfactorily in drilling a North Sea well.

Data from a plot of the shear stress versus temperature as measured by the Huxley-Bertram viscometer showed that composition 5 responded to temperature and pressure conditions encountered in drilling oil and gas wells in a predictable manner similar to the mineral oil field mud in the same laboratory tests.

The results of Examples 1–7 clearly demonstrate that the synthetic hydrocarbon oils of this invention are functionally effective in drilling fluid applications while remaining environmentally compatible.

EXAMPLE 8

Toxicity and rheology tests were performed on the following mud sample:

| Composition 6 | |
|---|---|
| OIL 100% UNHYDROGENATED MCP 1060 (Derived from Decene-1) | 221.78 cc |
| Water-brine (25%) | 60.08 cc |
| VERSA-WET | 4.00 grams |
| VERSA-COAT | 4.00 grams |
| VG-69 | 3.00 grams |
| Lime | 2.00 grams |
| Barite | 239.64 grams |

| RHEOLOGY AT ROOM TEMPERATURE AFTER HEAT AGING AT 200° F. FOR 16 HOURS | |
|---|---|
| PV | 47 |
| YP | 11 |
| GELS | 7/9 |
| ES | 680 |

TOXICITY
LC$_{50}$ 938,000 ppm indicating minimal toxicity
EMULSION STABILITY 680 indicating a stable emulsion

EXAMPLE 9

Physical properties were measured on the following mud sample made with 50% hydrogenated polyalphaolephin MCP-1063 which is made from Decene-1. The oil/water ratio was 80:20.

| Composition 7 | |
|---|---|
| MCP-1063 (partially hydrogenated) | 171 grams |
| Water | 50.75 grams |
| CaCl$_2$ | 17.9 grams |
| Emulsifier (Versacoat) | 2.0 grams |
| Wetting agent | 4.0 grams |
| Organo clay | 2.0 grams |
| Barite (weight material) | 329 grams |

| | Rheological Properties at 120° F. | |
|---|---|---|
| | Initial Properties at 120° F. | Properties After Heat Aging at 250° F./16 hours |
| PV | 42 | 46 |
| YP | 6 | 12 |
| GELS | 6/7 | 8/12 |
| ES | | 640 |

EXAMPLE 10

Physical properties were measured on the following mud sample made with unhydrogenated polyalphaolephin MCP-1060 which is made form decene-1. This was a 12 ppg mud.

| Composition 8 | |
|---|---|
| MCP-1060 | 187 grams |
| Water | 55.6 grams |
| CaCl$_2$ | 19.6 grams |
| Wetting agent VERSAWET | 4.0 grams |
| Sorbitan mono oleate | 5.0 grams |
| VG 69 organoclay | 4.0 grams |
| HRP amide (organphilic clay) | 1.0 grams |
| Barite | 220.5 grams |

| | Initial Properties at Room Temperature | Properties After Heat Aging at 250° F./16 Hours |
|---|---|---|
| PV | 49 | 61 |
| YP | 6 | 14 |
| GELS | 5/6 | 7/11 |
| ES | 420 | 900 |

EXAMPLE 11

Physical properties were measured on the following mud sample made with unhydrogenated polyalphaolephin MCP-1060 which is made from Decene-1. This was a mud with an oil water ratio of 80:20 weighted to 10.0 ppg with a low specific gravity (2.7) weighting material.

| Composition 9 | WEIGHT |
|---|---|
| MCP-1060 (unhydrogenated) | 176.12 |
| Water | 54.57 |
| CaCl$_2$ | 18.91 |
| VERSAWET | 4.5 |
| VERSACOAT | 4.0 |
| VG 69 | 4.0 |
| Lime | 2.0 |
| CaCO$_3$ (weighting agent) | 154.49 |

| | Initial Properties at Room Temperature | Properties After Heat Aging at 275° F./6 Hours |
|---|---|---|
| PV | 45 | 44 |
| YP | 5 | 16 |
| GELS | 5/7 | 9/14 |
| ES | 400 | 540 |

For purposes of the following examples the following laboratory mixing procedure was used for certain compositions. This procedure is provided as typical and was not used for all examples.

MIXING PROCEDURE (A) Measure out oil, pour into mixing cup, start mixer, slowly add organo clay. Mix 30 minutes at 9000 rpm on Hamilton Beach mixer.

(B) Take mixing cup with sample from mixer and weigh in emulsifier (VERSACOAT) and wetting agent (VERSAWET) into cup. Put back on mixer. Mix for 10 minutes at 9000 rpm.

(C) With mixer running slowly add lime. Mix for 10 minutes at 9000 rpm.

(D) Measure brine in graduated cylinders and pour into mixing cup slowly with sample mixing. Mix for 30 minutes at 9000 rpm.

(E) Weigh out weight material and add to mixing cup at slow rate while stirring at 9000 rpm. Mix for 30 minutes.

(F) Take sample from mixer and check rheology and emulsion stability at 120° F.

(G) Take mud and remix 3 minutes and pour into heat aging cell for 200° F. test. Tumble for 16 hours at 200° F.

(H) Take cells out after 16 hours in tumble oven and cool with air to room temperature.

(I) Remix mud for 10 minutes at 9000 rpm on Hamilton Beach mixer.

(J) Check rheology and emulsion stability at 120° F.

EXAMPLE 12

The following oil mud sample was made using 1060 oil unhydrogenated and tested for its physical properties. This was a 14 pound per gallon mud with an oil water ratio of 50:50.

| Composition 10 | |
|---|---|
| Oil 1060 | 128.76 cc |
| 25% CaCl$_2$ Brine | 139.44 |
| Barite | 303.30 |
| VERSACOAT | 4.0 |
| VERSAWET | 4.0 |
| Lime | 2.0 |

| | Initial Properties | | Tumbled at 200° For 16 Hours | |
|---|---|---|---|---|
| | 120° F. | 150° F. | 120° F. | 150° F. |
| PV | 77 | 58 | 97 | 69 |
| YP | 30 | 20 | 26 | 18 |
| GELS | 9/11 | 6/8 | 8/12 | 7/11 |
| ES | 240 | 240 | 200 | 220 |

EXAMPLE 13

The following example shows the properties of oil muds made with MCP 1060 oil unhydrogenated when mixed with different weights of Barite and Hematite at the same oil water ratio of 70:30.

| Composition 11 | Barite | | Hematite | |
|---|---|---|---|---|
| Density in ppg | 14 | 18 | 14 | 18 |
| Oil 1060 | 178.59 | 143.44 | 189.25 | 161.02 |
| Brine 25% CaCO$_3$ | 82.94 | 66.61 | 87.89 | 74.72 |
| VERSACOAT | 4 | 4 | 4 | 4 |
| VERSAWET | 4 | 4 | 4 | 4 |
| Lime | 2 | 2 | 2 | 2 |
| Organoclay | 0 | 0 | 1 | 0 |
| Barite | 333.07 | 549.28 | 0 | 0 |
| Hematite | 0 | 0 | 318.45 | 525.17 |
| Properties at 120° F. | | | | |
| INITIAL | | | | |
| PV | 39 | 86 | 35 | 57 |
| YP | 11 | 48 | 16 | 14 |
| GELS | 7/9 | 17/19 | 7/8 | 8/9 |
| ES | 560 | 860 | 700 | 580 |
| AFTER TUMBLING AT 200° F. FOR 16 HOURS | | | | |
| PV | 43 | 92 | 37 | 62 |
| YP | 4 | 20 | 9 | 9 |
| GELS | 5/7 | 10/14 | 6/8 | 6/8 |
| ES | 400 | 1040 | 600 | 740 |

EXAMPLE 14

The following example show the properties of an oil mud made with C$_8$ oligomer unhydrogenated oil This was a 14 pound per gallon mud with an oil/water ratio of 50:50.

| Composition 12 | |
|---|---|
| Oil C$_8$ oligomers | 128.76 cc |
| 25% CaCl$_2$ Brine | 139.44 cc |
| Barite | 303.30 grams |
| VERSACOAT | 4.0 grams |
| VERSAWET | 4.0 grams |
| Lime | 2.0 grams |
| Initial data at 120° F. | |
| PV | 115 |
| YP | 43 |
| GELS | 16/30 |
| ES | 380 |

Figure 1:
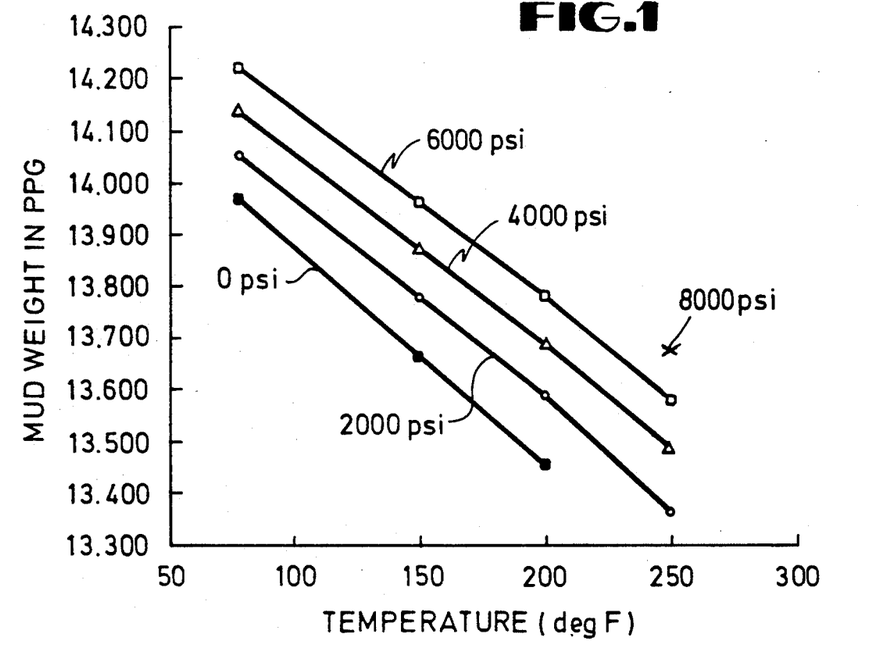
Figure 1 is a graphic representation of mud weight versus temperature at various pressures using a 14.0 ppg oil mud with 50/50 oil/water ratio using unhydrogenated polyalpha-octene oil, said oil having a viscosity of 15 cSt. at 72° F. as measured at 300 rpm on a Fann V-G meter rotational viscometer.
Figure 2:
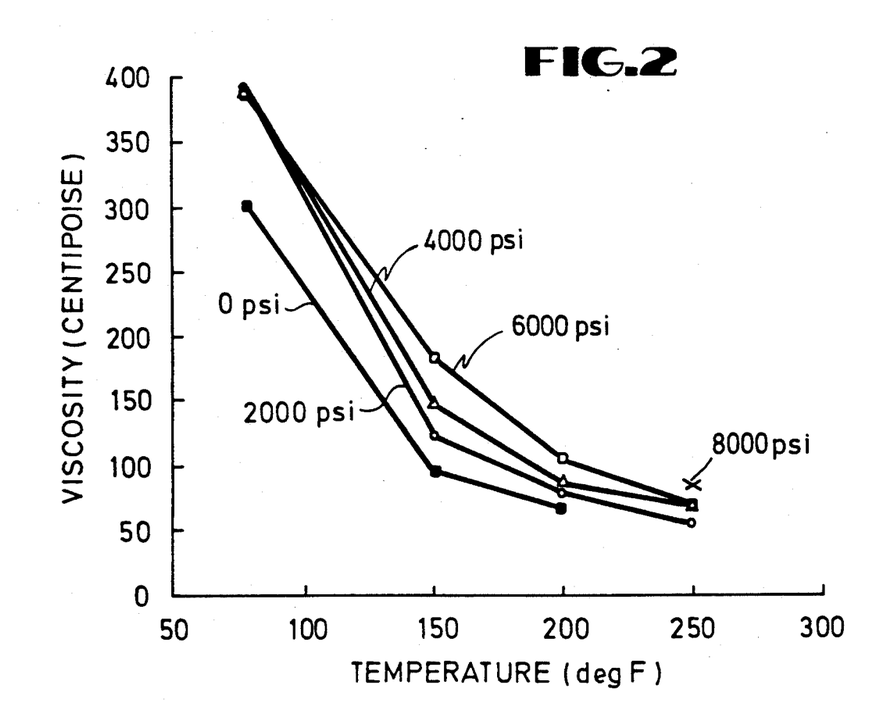
FIG. 2 is a graphic representation of viscosity at 511 reciprocal seconds versus temperatures at various pressures for the same oil mud as Figure 1.

Composition 12 was subjected to temperature and pressure in the Huxley Bertram high temperature, high pressure viscometer. The results are graphically illustrated in FIGS. -2. This fluid responded to temperature and pressure in a manner acceptable for use as drilling fluids in drilling oil and gas wells.

EXAMPLE 15

The following mud sample was made with a hydrogenated octene oligomer polyalphaolefin. This was a 14 pound per gallon mud made at oil/water ratio of 50:50.

| Composition 13 | | |
| --- | --- | --- |
| Oil, hydrogenated $C_8$ oligomers | 128.76 | cc |
| 25% $CaCl_2$ Brine | 139.44 | cc |
| Barite | 303.30 | grams |
| VERSACOAT | 4.0 | grams |
| VERSAWET | 4.0 | grams |
| Lime | 2.0 | grams |
| Initial Data 120° F. | | |
| PV | 117 | |
| YP | 48 | |
| GELS | 17/30 | |
| ES | 400 | |

Compositions of 12 ppg, 80/20 oil:water ratio oil muds using the oils of compositions 12 and 13 were subjected to bioassay testing in accordance with the procedures of Example 2. The $LC_{50}$ results were 188,000 and 158,000 respectively.

EXAMPLE 16

Figure 3:
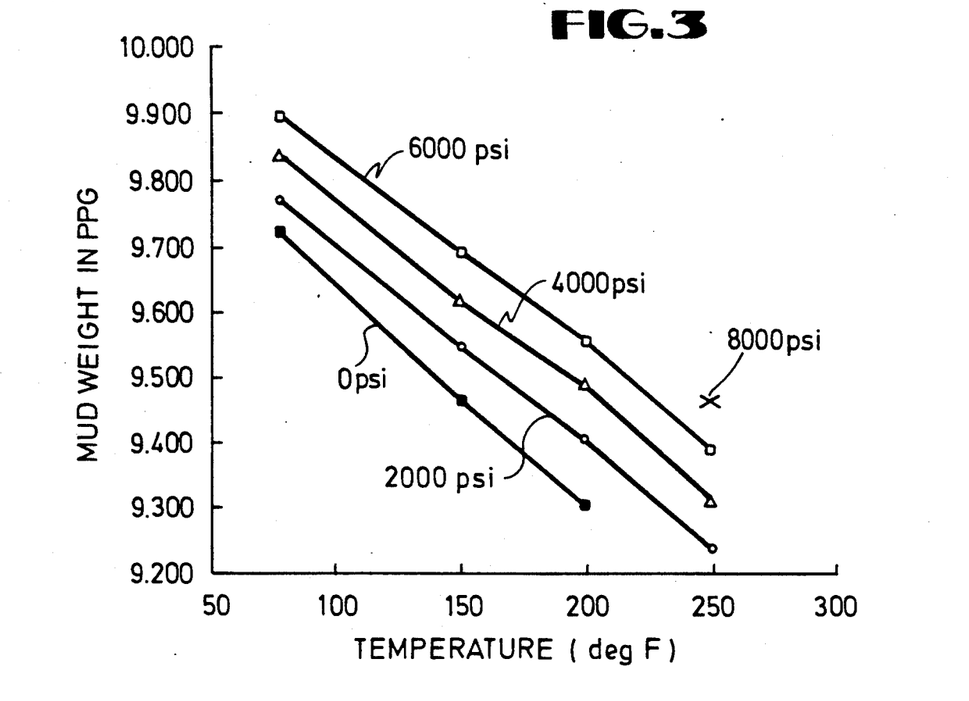
FIG. 3 is a graphic representation of mud weight versus temperature at various pressures using a 9.7 ppg oil mud with a 40/60 oil/water ratio using synthetic oil Emery 3002.
Figure 4:
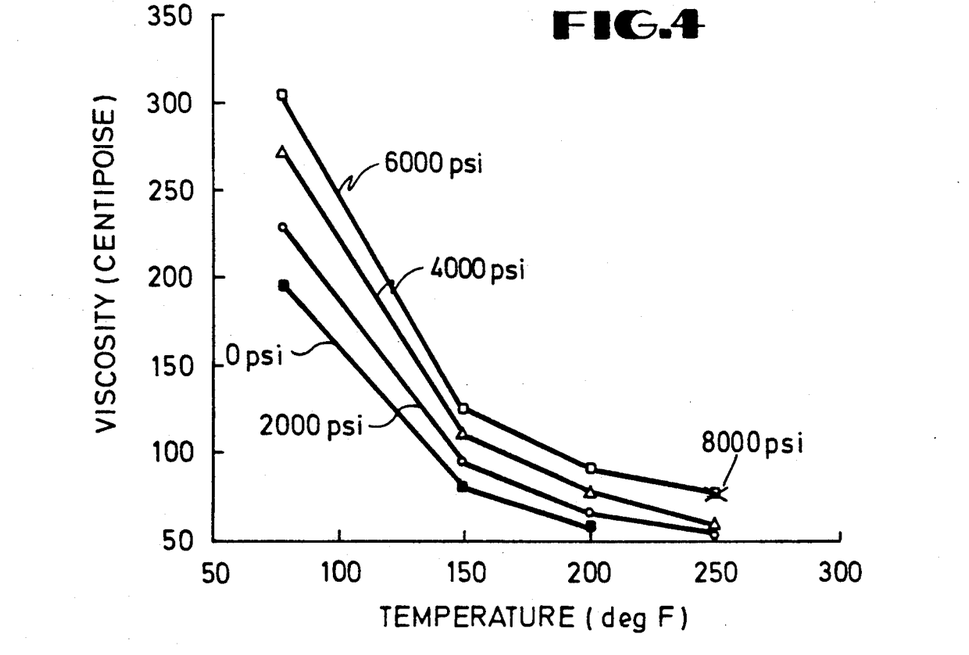
FIG. 4 is a graphic representation of viscosity at 511 reciprocal seconds versus temperature at various pressures for the same oil mud as FIG. 3.

A 9.7 ppg oil mud with a 40/60 oil:water ratio was formulated using Emery 3002 synthetic oil. The drilling mud was tested under temperature and pressure in the Huxley-Bertram viscometer. Results shown in FIGS. 3-4 indicate that the mud responds to temperature and pressure in a manner consistent with use as a drilling fluid in drilling oil and gas wells.

The results of Examples 8-16 clearly demonstrate that the synthetic hydrocarbon oils of this invention, whether hydrogenated or unhydrogenated, are functionally effective in drilling fluid applications using various emulsifiers and weight materials.

What is claimed is:

1. An improved continuous phase for an oil-based drilling fluid, said continuous phase comprising a nonhydrogenated synthetic hydrocarbon oil and a weight material, said synthetic hydrocarbon oil having an average molecular weight of from about 120 to about 1000 and being synthesized from one or more olefinic monomers having a chain length of $C_2$ to $C_{14}$.

2. The improved continuous phase for an oil based drilling fluid of claim 1 wherein said synthetic hydrocarbon oil comprises branched chain oligomers synthesized from one or more olefins containing a $C_2$ to $C_{12}$ chain length and wherein the oligomers have an average molecular weight of from 160 to 800.

3. The improved continuous phase for an oil based drilling fluid of claim 1 wherein said synthetic hydrocarbon oil comprises branched chain oligomers synthesized from one or more olefins containing a $C_2$ to $C_{10}$ chain length and wherein the oligomers have an average molecular weight of 200 to 600.

4. The improved continuous phase for an oil based drilling fluid of claim 1 wherein the viscosity of said oil is from 1.0 to 6.0 centiStokes when measured at 212° F.

5. The improved continuous phase for an oil-based drilling fluid of claim 1 wherein said synthetic hydrocarbons are selected form the group consisting of oligomers of: ethylene, propene, butene-1, isobutene, hexene, heptene, octene, nonene, decene, dodecene and combination thereof.

6. The improved continuous phase for an oil based drilling fluid of claim 1 wherein said synthetic hydrocarbon is polybutene.

7. The improved continuous phase for an oil based drilling fluid of claim 1 wherein said weight material is selected from the group consisting of: barite, iron oxide, calcium carbonate and combinations thereof.

8. An oil based drilling fluid comprising:
  (a) an improved continuous phase, said continuous phase comprising a nonhydrogenated synthetic hydrocarbon oil, said synthetic hydrocarbon oil having an average molecular weight of from about 120 to about 1000 and being synthesized from one or more olefinic monomers having a chain length of $C_2$ to $C_{14}$;
  (b) a weight material; and
  (c) water.

9. The oil based drilling fluid of claim 8 wherein said drilling fluid contains up to 70% water by volume.

10. The oil based drilling fluid of claim 8 including said improved continuous phase wherein said drilling fluid further contains an emulsifier.

11. The oil based drilling fluid of claim 10 wherein said emulsifier is selected form the group consisting of: fatty acids, soaps of fatty acids, amido-amines, polyamides, polyamines, oleate esters, imidazolines, alcohols, and combinations thereof.

12. The oil based drilling fluid of claim 10 wherein said emulsifier is present at a concentration of up to 10% by weight.

13. The oil based drilling fluid of claim 8 further comprising a wetting agent.

14. The oil based drilling fluid of claim 13 wherein said wetting agent is selected form the group consisting of: crude tall oil, oxidized crude tall oil, organic phosphate esters, imidazolines, alkyl aromatic sulfonates and combinations thereof.

15. The oil based drilling fluid of claim 8 further comprising a viscosifier.

16. The oil based drilling fluid of claim 15 wherein said viscosifier is selected from the group consisting of: organophilic clays, oil soluble polymers, polycarboxylic acid, soaps and combinations thereof.

17. The oil based drilling fluid of claim 8 wherein said weight material is selected form the group consisting of: barite, iron oxide, calcium carbonate and combinations thereof.

18. A drilling fluid, said drilling fluid including an improved continuous phase, said drilling fluid comprising:
  (a) a continuous phase comprising a nonhydrogenated synthetic hydrocarbon, said synthetic hydrocarbon having an average molecular weight of from about 120 to about 1000 and being synthesized form one or more olefinic monomers having a chain length of $C_2$ to $C_{14}$.
  (b) a water-in-oil emulsifier;
  (c) an aqueous phase, said aqueous phase comprising up to about 70% of said drilling fluid by volume; and
  (d) a weight material.

19. An oil based drilling fluid comprising:
  (a) an improved continuous phase comprising a nonhydrogenated synthetic hydrocarbon, said synthetic hydrocarbon having an average molecular weight of from about 120 to about 1000 and being synthesized from en or more olefinic monomers having a claim length of $C_2$ to $C_{14}$;

(b) a water-in-oil emulsifier selected from the group consisting of: fatty acids, soaps of fatty acids, amido-amines, polyamides, polyamines, oleate esters, imidazolines, alcohols, and combinations thereof;

(c) an aqueous phase, said aqueous phase comprising up to about 70% of said drilling fluid by volume; and (d) a weight material.

20. The oil based drilling fluid of claim 19 further comprising a wetting agent.

21. The oil based drilling fluid of claim 20 wherein said wetting agent is selected for the group consisting of: crude tall oil, oxidized crude tall oil, organic phosphate esters, imidazolines, alkyl aromatic sulfates, and combinations thereof.

22. The oil based drilling fluid of claim 19 further comprising a viscosifier.

23. The oil based drilling fluid of claim 22 wherein said viscosifier is selected from the group consisting of: organophilic clays, oil soluble polymers, polycarboxylic acids, soaps and combinations thereof.

* * * * *

UNITED STATES PATENT AND TRADEMARK OFFICE
CERTIFICATE OF CORRECTION

PATENT NO. : 5,189,012
DATED : Feb. 23, 1993
INVENTOR(S) : Arvind D. Patel, et al.

It is certified that error appears in the above-identified patent and that said Letters Patent is hereby corrected as shown below:

Column 17, line 65, delete "form" and insert --from--;

Column 18, line 24, delete "form" and insert --from--;

Column 18, line 34, delete "form" and insert --from--;

Column 18, line 45, delete "form" and insert --from--;

Column 18, line 55, delete "form" and insert --from--;

Column 18, line 67, delete "en" and insert --one--;

Column 20, line 2, delete "for" and insert --from--.

Signed and Sealed this

Twenty-third Day of November, 1993

Attest:

BRUCE LEHMAN

Attesting Officer — Commissioner of Patents and Trademarks